(12) United States Patent
Vanek et al.

(10) Patent No.: US 9,915,055 B2
(45) Date of Patent: Mar. 13, 2018

(54) TAILGATE

(71) Applicant: Clark Equipment Company, West Fargo, ND (US)

(72) Inventors: Karel Vanek, Mnisek pod Brdy (CZ); Tomas Bartausic, Prague (CZ)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 14/926,907

(22) Filed: Oct. 29, 2015

(65) Prior Publication Data
US 2016/0122975 A1    May 5, 2016

Related U.S. Application Data

(60) Provisional application No. 62/072,174, filed on Oct. 29, 2014.

(51) Int. Cl.
*E02F 9/08* (2006.01)
*B62D 25/10* (2006.01)

(52) U.S. Cl.
CPC ........... *E02F 9/0891* (2013.01); *B62D 25/10* (2013.01)

(58) Field of Classification Search
CPC ....... E02F 9/0891; B62D 25/10; B62D 25/12; E05D 3/02; E05D 7/00
See application file for complete search history.

(56) References Cited

U.S. PATENT DOCUMENTS

| 5,611,584 | A  | * | 3/1997  | Giese    | B62D 25/12 |
|           |    |   |         |          | 16/292     |
| 6,175,991 | B1 | * | 1/2001  | Driesman | E05D 3/147 |
|           |    |   |         |          | 16/366     |
| 6,213,235 | B1 |   | 4/2001  | Elhardt et al. | |
| 6,817,063 | B1 | * | 11/2004 | Nania    | E05D 3/127 |
|           |    |   |         |          | 16/334     |
| 8,347,554 | B2 | * | 1/2013  | Uto      | E02F 9/00  |
|           |    |   |         |          | 49/381     |
| 2011/0126469 | A1 | * | 6/2011 | Uto    | E02F 9/00  |
|           |    |   |         |          | 49/397     |
| 2011/0185637 | A1 | * | 8/2011 | Uto    | E02F 9/00  |
|           |    |   |         |          | 49/399     |
| 2014/0265452 | A1 |   | 9/2014 | Hite   |            |

FOREIGN PATENT DOCUMENTS

| EP | 1741618 A1    | 1/2007  |
| EP | 2789752 A1    | 10/2014 |
| WO | 2013015796 A2 | 1/2013  |

OTHER PUBLICATIONS

International Search Report and Written Opinion dated Jan. 19, 2016 for International Application No. PCT/US2015/058063 filed Oct. 29, 2015, 11 pages.

* cited by examiner

*Primary Examiner* — Erez Gurari
(74) *Attorney, Agent, or Firm* — John D. Veldhuis-Kroeze; Westman, Champlin & Koehler, P.A.

(57) ABSTRACT

An attachment system for attaching a tailgate to a frame of a power machine. The tailgate is moveable between a closed position and an opened position. The attachment system includes first and second attachment structures for pivotally mounting the cover to the frame. The second attachment structure is spaced apart from the first attachment structure. A connection member connects the first attachment structure and the second attachment structure. The tailgate is configured to pivot about the connection member as it moves between the closed position and the open position.

14 Claims, 8 Drawing Sheets

TAILGATE

CROSS-REFERENCE TO RELATED APPLICATION

This application claims the benefit of U.S. Provisional Application No. 62/072,174, filed Oct. 29, 2014.

BACKGROUND

This disclosure is directed toward power machines. More particularly, this disclosure is related to tailgates that are mountable to power machines. Power machines, for the purposes of this disclosure, include any type of machine that generates power for the purpose of accomplishing a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include excavators, loaders, utility vehicles, tractors, and trenchers, to name a few examples.

Many power machines such as excavators and loaders have a tailgate that is pivotally mounted to a frame of the power machine and moveable between an opened and a closed position. In the open position, the tailgate is moved away from the frame to allow access to various components such as an engine and other related components. Tailgates on such machines typically have a latch and are hinged to the frame so that they rotate about a generally vertical axis between a fully opened and a closed position.

The discussion above is merely provided for general background information and is not intended to be used as an aid in determining the scope of the claimed subject matter.

SUMMARY

The present disclosure is directed toward a connection system for mounting a tailgate or cover to the frame of a power machine. In one embodiment, a linkage for rotatably securing a tailgate to a frame of a power machine is disclosed. The linkage includes a first attachment structure for operably coupling the tailgate and the frame and a second attachment structure for operably coupling the tailgate and the frame, the second attachment structure being spaced apart from the first attachment structure. A connecting member is operably coupled to the first attachment structure and the second attachment structure.

In another embodiment, a power machine is disclosed. The power machine has a frame, an engine mounted to the frame, an aperture in the frame for allowing access to the engine, a cover for the aperture. The cover is moveable between a closed position and an opened position. A mounting structure pivotally mounts the cover to the frame. The mounting structure includes a first attachment structure for pivotally mounting the cover to the frame and a second attachment structure for pivotally mounting the cover to the frame, with the second attachment structure being spaced apart from the first attachment structure. A connection member connects the first attachment structure and the second attachment structure. The cover is configured to pivot about the connection member as it moves between the closed position and the open position.

Another embodiment is directed toward a method of coupling a tailgate to a frame of a power machine so that the tailgate is moveable between a closed position and an opened position. The method includes providing a first attachment structure having a four bar linkage. Providing this first attachment structure includes providing a first link that is coupled to the frame at a first pivotal joint and to the tailgate at a second pivotal joint and providing a second link that is coupled to the frame at a third pivotal joint and to the tailgate at a fourth pivotal joint. The four bar linkage is defined by the first link, the second link, a portion of the frame between the first pivotal joint and the third pivotal joint, and a portion of the tailgate between the second pivotal joint and the fourth pivotal joint. The method further provides includes providing a second attachment structure that is operably coupled to the tailgate and the frame and attaching a connecting rod between the first attachment structure and the second attachment structure so that when the tailgate moves between the opened and closed positions, the tailgate pivots about an axis that runs through the connection rod.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Figure 2:
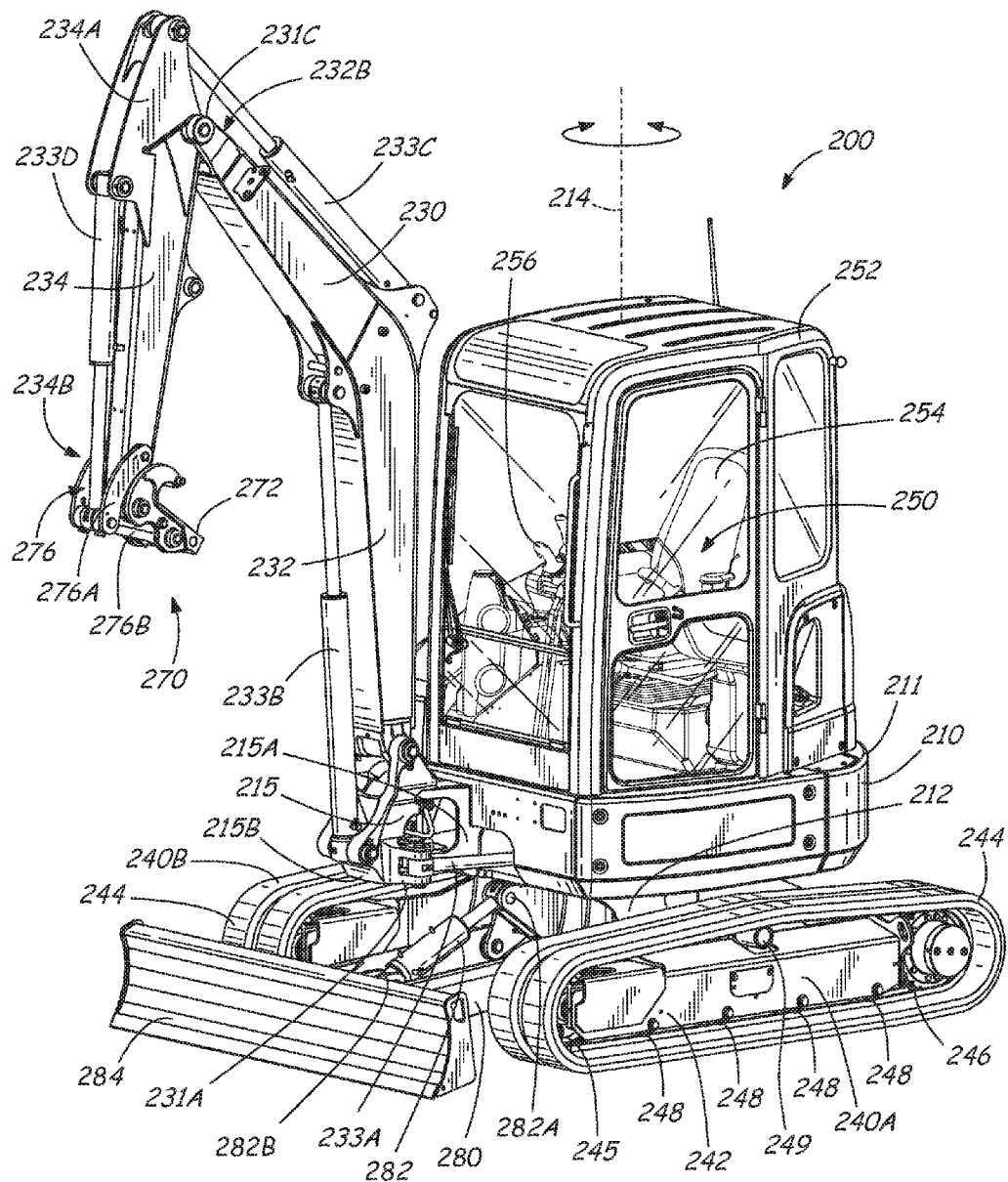
FIG. 2 is a front left perspective view of a representative power machine in the form of an excavator on which the disclosed embodiments can be practiced.
Figure 3:
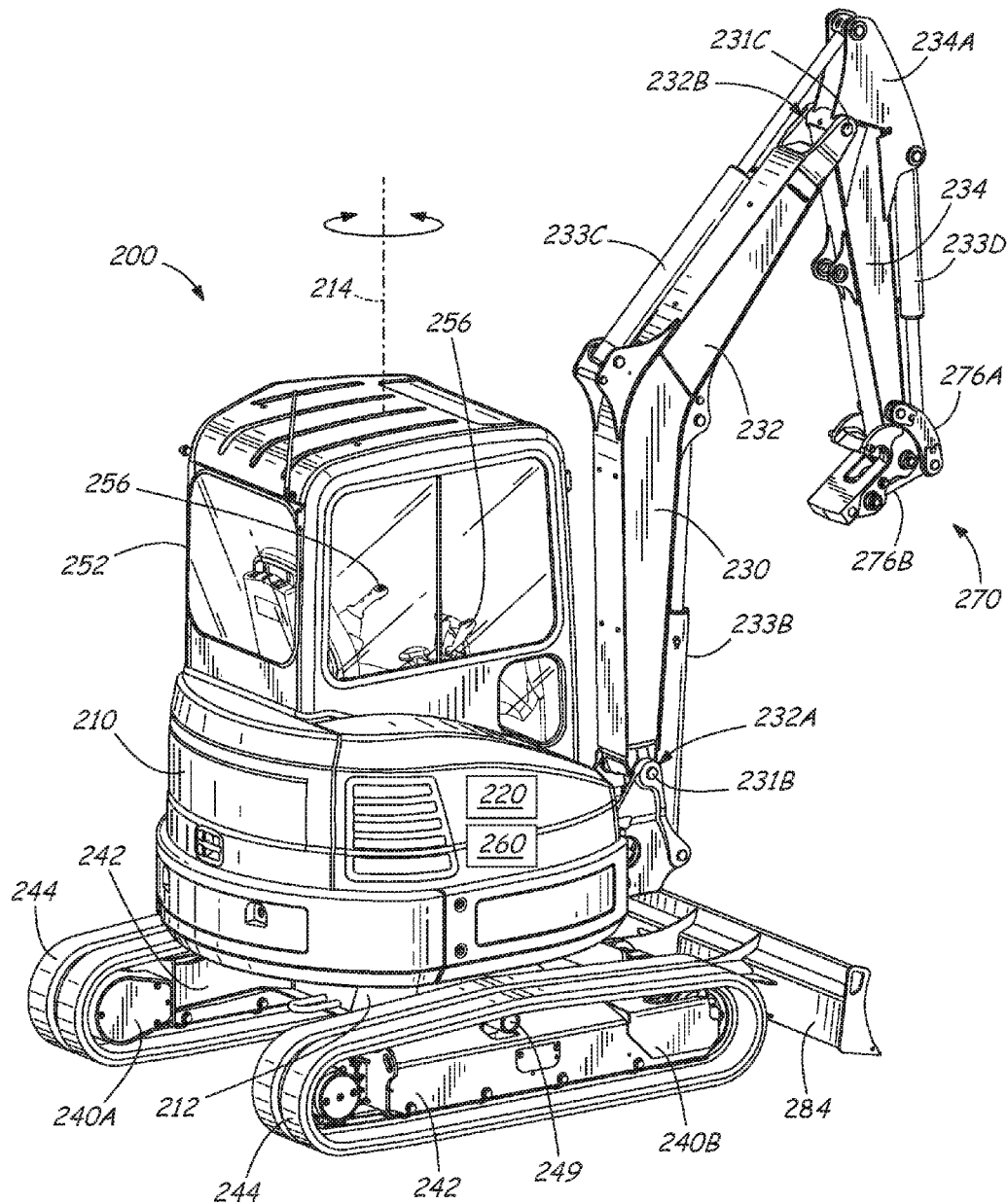
FIG. 3 is a rear right perspective view of the excavator of FIG. 2.

This disclosure is directed at tailgates or covers that can be attached to the frame of a power machine and attachment structures that rotatably secure the tailgate to the frame. Tailgates on many power machines are hinged along a vertical edge of the tailgate so that the tailgate The embodiments discussed below disclose attachment structures that draw the tailgate toward the machine as the tailgate is opened so that even in the fully opened position, the tailgate will not swing open wider than the frame of the power machine. These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is discussed. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power. Although the power machines discussed herein are excavators, the embodiments discussed herein can be applied to various types of power machines, including loaders, trenchers, tractors, and the like.

Figure 1:
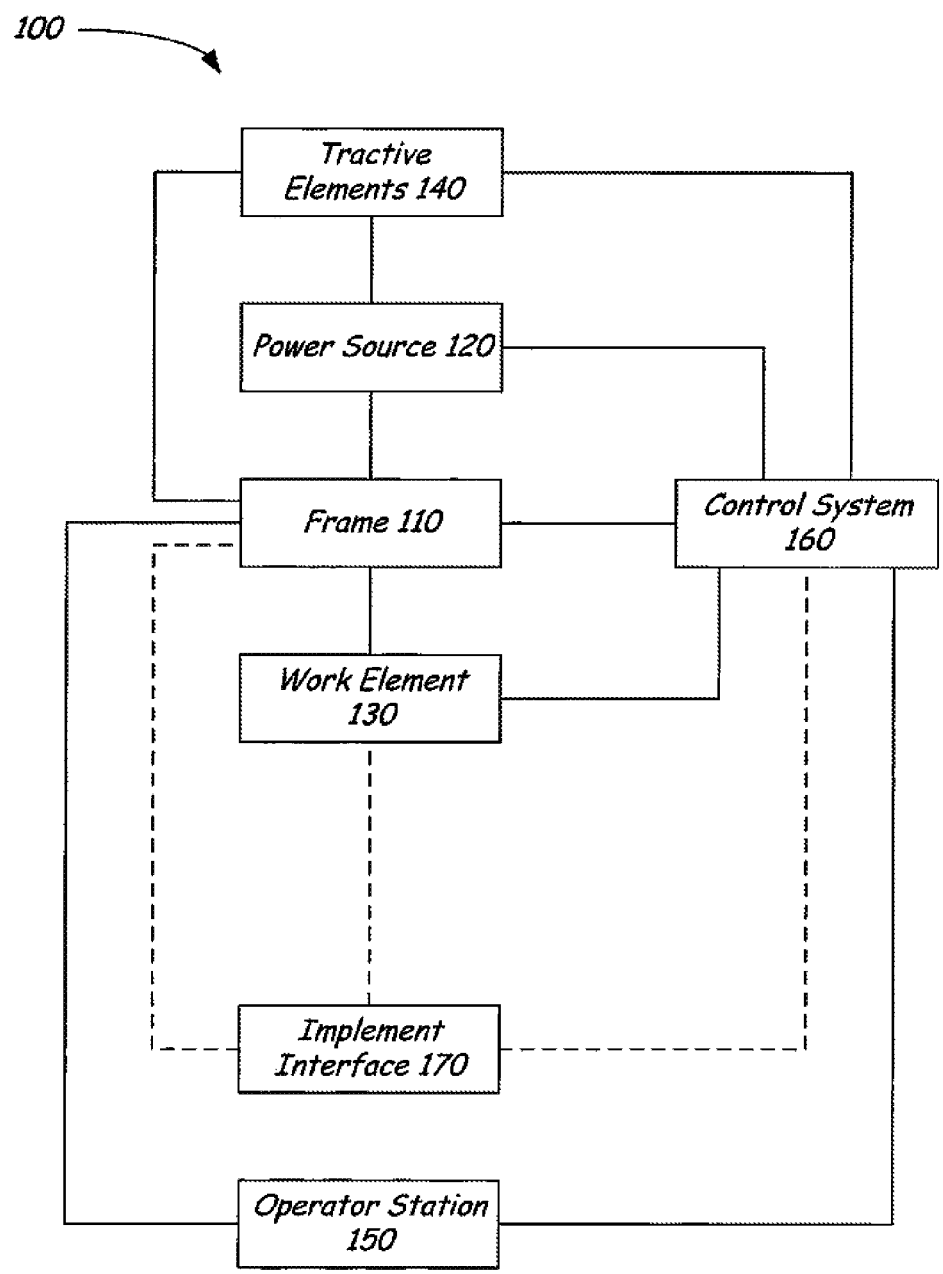
FIG. 1 is a block diagram illustrating functional systems of a representative power machine on which embodiments of the present disclosure can be practiced.

Referring now to FIG. 1, a block diagram illustrates the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is capable of providing power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, wheels attached to an axle, track assemblies, and the like. Tractive elements can be rigidly mounted to the frame such that movement of the tractive element is limited to rotation about an axle or steerably mounted to the frame to accomplish steering by pivoting the tractive element with respect to the frame.

Power machine 100 includes an operator station 150, which provides a position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote control device can be provided (i.e. remote from both of the power machine and any implement to which is it coupled) that is capable of controlling at least some of the operator controlled functions on the power machine.

FIGS. 2-3 illustrate an excavator 200, which is one particular example of a power machine of the type illustrated in FIG. 1, on which the disclosed embodiments can be employed. Unless specifically noted otherwise, embodiments disclosed below can be practiced on a variety of power machines, with the excavator 200 being only one of those power machines. Excavator 200 is described below for illustrative purposes. Not every excavator or power machine on which the illustrative embodiments can be practiced need have all of the features or be limited to the features that excavator 200 has. Excavator 200 has a frame 210 that supports and encloses a power system 220 (represented in FIGS. 2-3 as a block, as the actual power system is enclosed within the frame 210). The power system 220 includes an engine that provides a power output to a hydraulic system. The hydraulic system acts as a power conversion system that includes one or more hydraulic pumps for selectively providing pressurized hydraulic fluid to actuators that are operably coupled to work elements in response to signals provided by operator input devices. The hydraulic system also includes a control valve system that selectively provides pressurized hydraulic fluid to actuators in response to signals provided by operator input devices. The excavator 200 includes a plurality of work elements in the form of a first lift arm structure 230 and a second lift arm structure 280 (not all excavators have a second lift arm structure). In addition, excavator 200, being a work vehicle, includes a pair of tractive elements in the form of left and right track assemblies 240A and 240B, which are disposed on opposing sides of the frame 210.

An operator compartment 250 is defined in part by a cab 252, which is mounted on the frame 210. The cab 252 shown on excavator 200 is an enclosed structure, but other operator compartments need not be enclosed. For example, some excavators have a canopy that provides a roof but is not enclosed A control system, shown as block 260 is provided for controlling the various work elements. Control system 260 includes operator input devices, which interact with the power system 220 to selectively provide power signals to actuators to control work functions on the excavator 200.

Frame 210 includes an upper frame portion or house 211 that is pivotally mounted on a lower frame portion or undercarriage 212 via a swivel joint. The swivel joint includes a bearing, a ring gear, and a slew motor with a pinion gear (not pictured) that engages the ring gear to swivel the machine. The slew motor receives a power signal from the control system 260 to rotate the house 211 with respect to the undercarriage 212. House 211 is capable of unlimited rotation about a swivel axis 214 under power with respect to the undercarriage 212 in response to manipulation of an input device by an operator. Hydraulic conduits are fed through the swivel joint via a hydraulic swivel to provide pressurized hydraulic fluid to the tractive elements and one or more work elements such as lift arm 280 that are operably coupled to the undercarriage 212.

The first lift arm structure 230 is mounted to the house 211 via a swing mount 215. (Some excavators do not have a swing mount of the type described here.) The first lift arm structure 230 is a boom-arm lift arm of the type that is generally employed on excavators although certain features of this lift arm structure may be unique to the lift arm illustrated in FIGS. 2-3. The swing mount 215 includes a frame portion 215A and a lift arm portion 215B that is rotationally mounted to the frame portion 215A at a mounting frame pivot 231A. A swing actuator 233A is coupled to the house 211 and the lift arm portion 215B of the mount. Actuation of the swing actuator 233A causes the lift arm structure 230 to pivot or swing about an axis that extends longitudinally through the mounting frame pivot 231A.

The first lift arm structure 230 includes a first portion, known generally as a boom 232 and a second portion known as an arm or a dipper 234. The boom 232 is pivotally attached on a first end 232A to mount 215 at boom pivot mount 231B. A boom actuator 233B is attached to the mount 215 and the boom 232. Actuation of the boom actuator 233B causes the boom 232 to pivot about the boom pivot mount 231B, which effectively causes a second end 232B of the boom to be raised and lowered with respect to the house 211. A first end 234A of the arm 234 is pivotally attached to the second end 232B of the boom 232 at an arm mount pivot 231C. An arm actuator 233C is attached to the boom 232 and the arm 234. Actuation of the arm actuator 233C causes the arm to pivot about the arm mount pivot 231C. Each of the swing actuator 233A, the boom actuator 233B, and the arm actuator 233C can be independently controlled in response to control signals from operator input devices.

An exemplary implement interface 270 is provided at a second end 234B of the arm 234. The implement interface 270 includes an implement carrier 272 that is capable of accepting and securing a variety of different implements to the lift arm 230. Such implements have a machine interface that is configured to be engaged with the implement carrier 272. The implement carrier 272 is pivotally mounted to the second end 234B of the arm 234. An implement carrier actuator 233D is operably coupled to the arm 234 and a linkage assembly 276. The linkage assembly includes a first link 276A and a second link 276B. The first link 276A is pivotally mounted to the arm 234 and the implement carrier actuator 233D. The second link 276B is pivotally mounted to the implement carrier 272 and the first link 276A. The linkage assembly 276 is provided to allow the implement carrier 272 to pivot about the arm 234 when the implement carrier actuator 233D is actuated.

The implement interface 270 also includes an implement power source (not shown in FIGS. 2-3) available for connection to an implement on the lift arm structure 230. The implement power source includes pressurized hydraulic fluid port to which an implement can be coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The electrical power source can also include electrical conduits that are in communication with a data bus on the excavator 200 to allow communication between a controller on an implement and electronic devices on the excavator 200. It should be noted that the specific implement power source on excavator 200 does not include an electrical power source.

The lower frame 212 supports and has attached to it a pair of tractive elements 240, identified in FIGS. 2-3 as left track drive assembly 240A and right track drive assembly 240B. Each of the tractive elements 240 has a track frame 242 that is coupled to the lower frame 212. The track frame 242 supports and is surrounded by an endless track 244, which rotates under power to propel the excavator 200 over a support surface. Various elements are coupled to or otherwise supported by the track 242 for engaging and supporting the track 244 and cause it to rotate about the track frame. For example, a sprocket 246 is supported by the track frame 242 and engages the endless track 244 to cause the endless track to rotate about the track frame. An idler 245 is held against the track 244 by a tensioner (not shown) to maintain proper tension on the track. The track frame 242 also supports a plurality of rollers 248, which engage the track and, through the track, the support surface to support and distribute the weight of the excavator 200. An upper track guide 249 is provided for applying tension to track 244 and preventing the track from rubbing on track frame 242.

The second or lower lift arm 280 is pivotally attached to the lower frame 212. A lower lift arm actuator 282 is pivotally coupled to the lower frame 212 at a first end 282A and to the lower lift arm 280 at a second end 282B. The lower lift arm 280 is configured to carry a lower implement 284. The lower implement 284 can be rigidly fixed to the lower lift arm 280 such that it is integral to the lift arm. Alternatively, the lower implement can be pivotally attached to the lower lift arm via an implement interface, which in some embodiments can include an implement carrier of the type described above. Lower lift arms with implement interfaces can accept and secure various different types of implements thereto. Actuation of the lower lift arm actuator 282, in response to operator input, causes the lower lift arm 280 to pivot with respect to the lower frame 212, thereby raising and lowering the lower implement 284.

Upper frame portion 211 supports cab 252, which defines, at least in part, operator compartment or station 250. A seat 254 is provided within cab 252 in which an operator can be seated while operating the excavator. While sitting in the seat 254, an operator will have access to a plurality of operator input devices 256 that the operator can manipulate to control various work functions, such as manipulating the lift arm 230, the lower lift arm 280, the traction system 240, pivoting the house 211, the tractive elements 240, and so forth.

Excavator 200 provides a variety of different operator input devices 256 to control various functions. For example, hydraulic joysticks are provided to control the lift arm 230, and swiveling of the house 211 of the excavator. Foot pedals with attached levers are provided for controlling travel and lift arm swing. Electrical switches are located on the joysticks for controlling the providing of power to an implement attached to the implement carrier 272. Other types of operator inputs that can be used in excavator 200 and other excavators and power machines include, but are not limited to, switches, buttons, knobs, levers, variable sliders and the like. The specific control examples provided above are exemplary in nature and not intended to describe the input devices for all excavators and what they control.

Display devices are provided in the cab to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided.

The description of power machine 100 and excavator 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on an excavator such as excavator 200, unless otherwise noted, the concepts discussed below are not intended to be limited in their application to the environments specifically described above.

Figure 4:
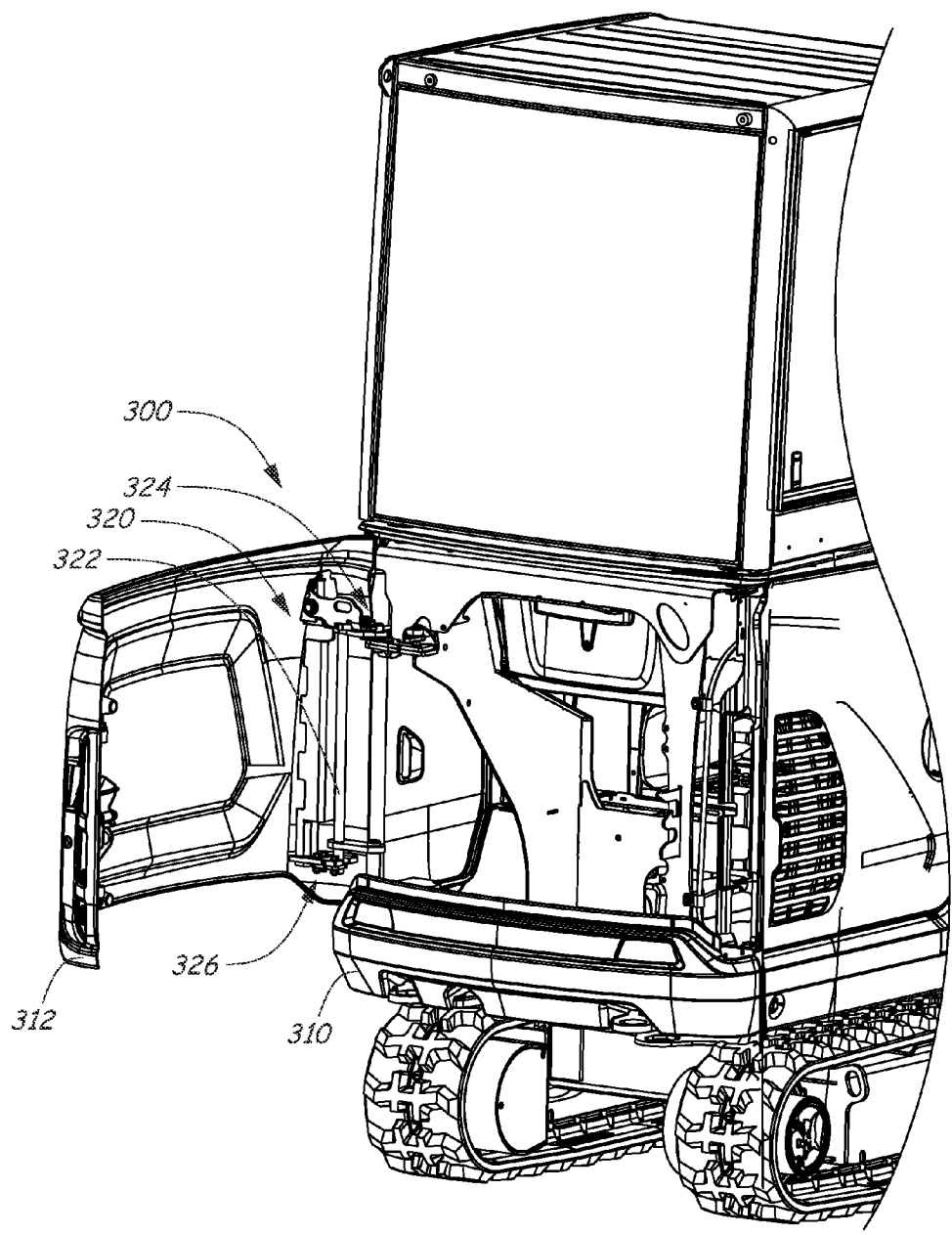
FIG. 4 is a rear perspective view of a portion of an excavator having a mechanism for rotatably attaching a tailgate to a frame according to one illustrative embodiment.

FIG. 4 illustrates a power machine 300 in the form of an excavator having a tailgate 312 rotatably coupled to a frame 310 according to one illustrative embodiment. Tailgate 312 is shown in a fully open position and various components are removed from inside the frame 310 to allow for better visibility as to how the tailgate is coupled to the frame. As shown in FIG. 4, when the tailgate 312 is in the fully open position, it is drawn in toward the machine so that the tailgate does not extend laterally of the outside of the frame or at worst extends only slightly laterally of the frame.

Tailgate 312 is operably coupled to the frame via an attachment structure 320. The attachment structure 320 allows the tailgate to be moved from an opened position (shown in FIG. 4) and a closed position. As will be discussed below, the attachment structure, rather than being a simple hinge mechanism has a floating pivot that moves during an opening or a closing operation to hold the door completely or substantially completely within the lateral reach of the frame 310. The attachment structure 320 includes a first attachment structure 324 and a second attachment structure 326, which is spaced apart from the first attachment structure. A connecting mechanism 322, which in the embodiment shown in FIG. 4 is a rod, connects the first attachment structure 324 to the second attachment structure 326. As will be discussed in more detail below, the first attachment structure is a four bar linkage that includes a pair of links each attached to the tailgate 312 and the frame 310. The four bar linkage arrangement allows the connecting mechanism to move. As is also shown below, the tailgate pivots about the connecting mechanism. In some embodiments, including those shown in FIGS. 4-8, the second attachment structure 326 has a link that is attached to the tailgate 312 and the frame that allows the connecting mechanism to move but limits movement to an arcuate path.

Figure 5:
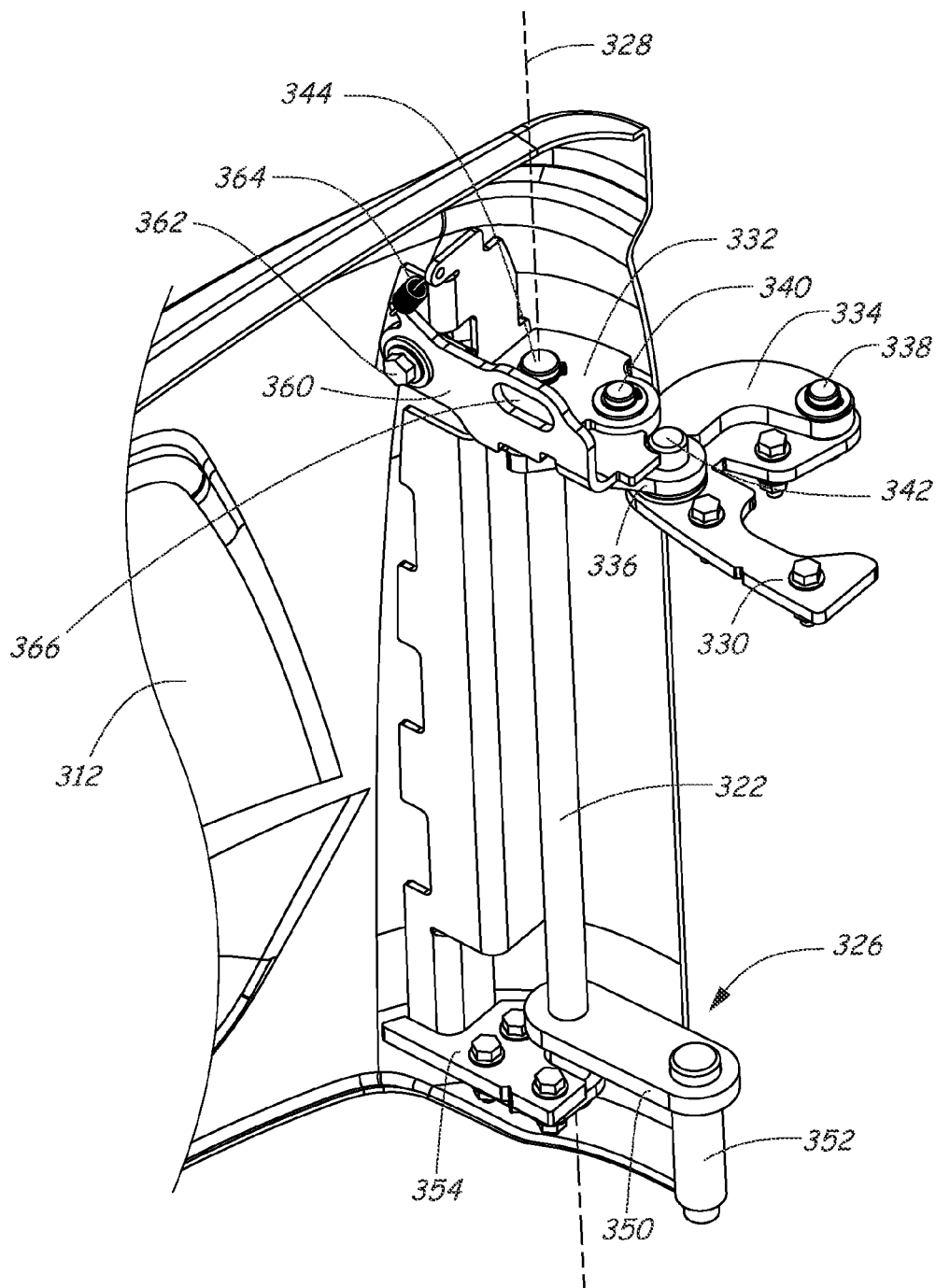
FIG. 5 illustrates components of the mechanism for attaching the tailgate of FIG. 4, showing the tailgate in a fully open position.
Figure 6:
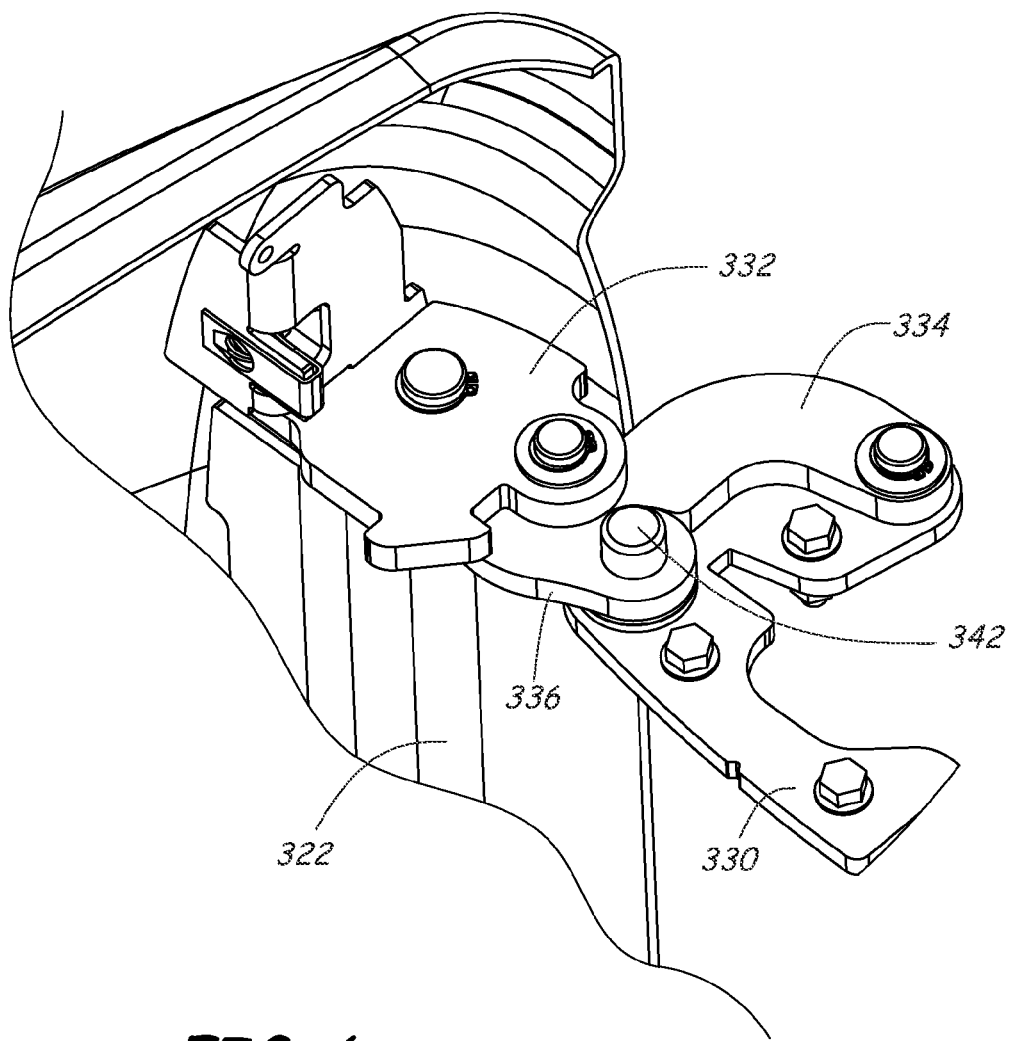
FIG. 6 illustrates components of a first attachment mechanism of the mechanism of FIG. 5 with a catch for holding the tailgate in an open position removed.
Figure 7:
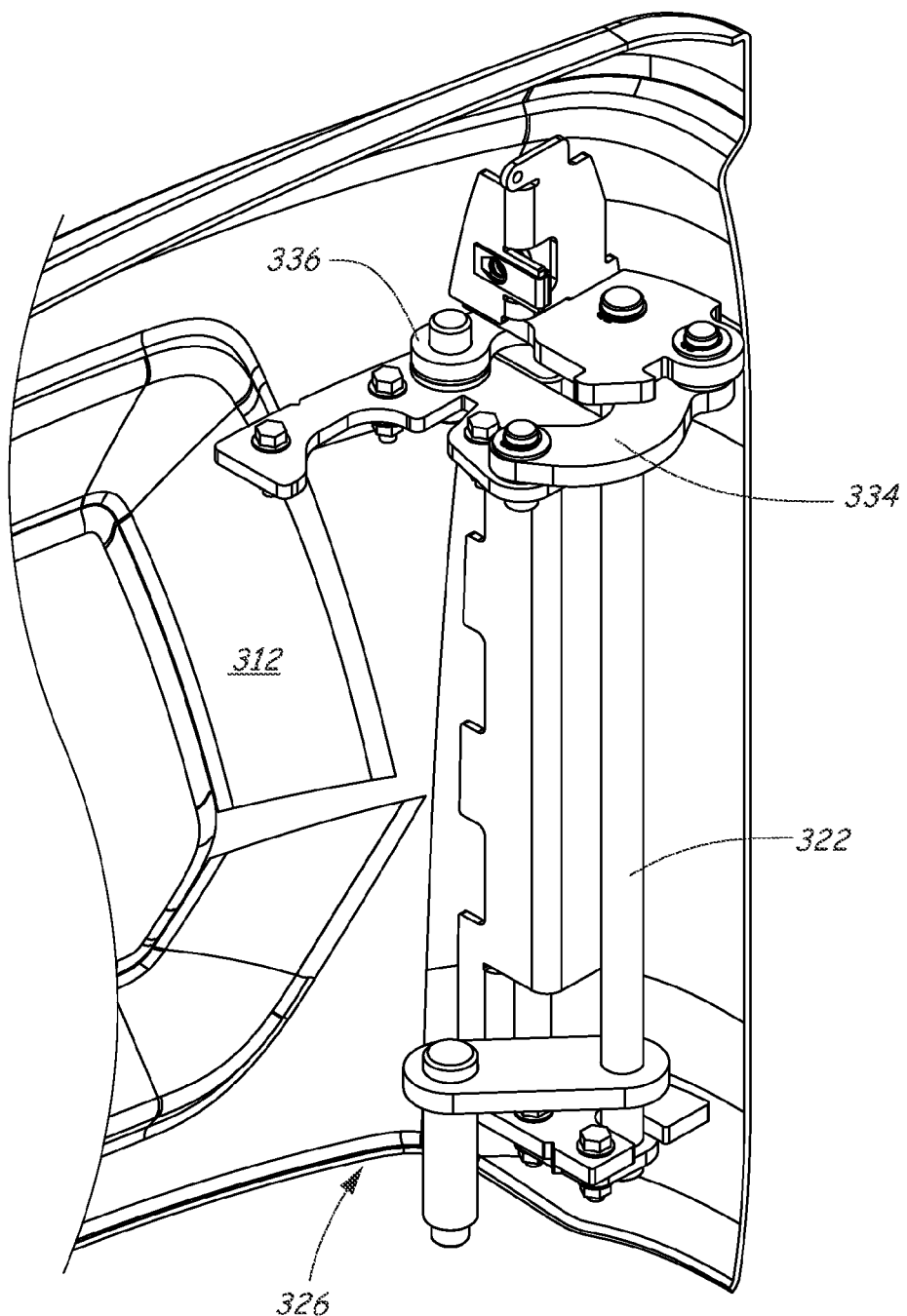
FIG. 7 illustrates the components of the mechanism of FIG. 5 with the tailgate in a fully closed position.

FIGS. 5-8 illustrate the attachment structure 320 in more detail. FIG. 5 illustrates the attachment structure 320 and its attachment to the tailgate 312 in an open position. The attachment structure 320 includes first and second attachment structures 324 and 326, which are attached to the frame 310 and the tailgate 312. A connecting rod 322 connects the first attachment structure 324 to the second attachment structure 322. The connecting rod 322 is also coupled to the tailgate 312 such that the tailgate 312 pivots about an axis 328 that extends through the connecting rod 322. The first and second attachment structures 324 and 326 are arranged such that as the tailgate 312 moves between the closed and open positions, the connecting rod 322 moves so that the tailgate 312 moves not only because the tailgate is pivoting about the connecting rod 322 but also because the connecting rod itself is moving. This movement is limited along a defined arcuate path, which causes the tailgate to be drawn laterally inward as the tailgate moves toward a fully open position.

The first attachment structure 324 includes a four-bar arrangement including a machine bracket 330, which is rigidly attached to the frame 310 and a tailgate bracket 332, which is rigidly attached to the tailgate 312. Links 334 and 336 are each pivotally attached to the machine bracket 330 and the tailgate bracket 332. The link 334 is attached to the machine bracket 330 at a first pivot 338 and to the tailgate bracket 332 at a second pivot 340. The link 336 is attached to the machine bracket 330 at a third pivot 342 and at a fourth pivot 344. The connecting rod 322 is also attached to the fourth pivot 344.

The second attachment structure 326 includes a control link 350 that is operably coupled to the frame 310, the tailgate 312, and the connecting rod 322. The control link 350, as discussed in more detail below, serves to control the path of travel of the link 336 via the connecting rod to a defined arcuate path as the control link pivots about its pivotal coupling to the frame 310. The control link 350 is, in the embodiment shown, is coupled to the frame 310 via a pin 352 and to the tailgate 312 via the connecting rod 322, which is also pivotally coupled to the tailgate 312 via a second tailgate bracket 354.

Link 334 is a driving link that moves along an arcuate path pivoting about the first pivot 338. The arcuate path is defined by the movement of second pivot 340, which travels an arcuate path about the first pivot 338, the arcuate path being unique, in that the second pivot 340 moves from one end of the path when the tailgate is closed to the other end when the tailgate is fully open without doubling back on any portion of the path. Link 336 is a driven link that moves in response to the movement of the driving link (and constrained by control link 350) by pivoting about third pivot 342. By pivoting about the third pivot 342, the driven link 336 moves in an arcuate path, the arcuate path being defined by the path traveled by the fourth pivot 344. In one embodiment, the geometry of the four bar linkage is such that the path traveled by the fourth pivot is not unique. That is, when the tailgate moves from the closed position toward the open position, the fourth pivot moves from a first end of the path toward a second end of the path until it reaches an intermediate point. As the tailgate moves from the intermediate point to the fully open position, the fourth pivot moves toward the first end of the path. As the connecting member is connected to the fourth pivot, the movement of the fourth pivot toward the first end acts to draw in the tailgate.

As the tailgate moves from the fully open position to the intermediate position, the fourth pivot moves toward the second end of the path. From the intermediate position to the closed position, the fourth pivot moves toward the first end of the path.

Figure 8:
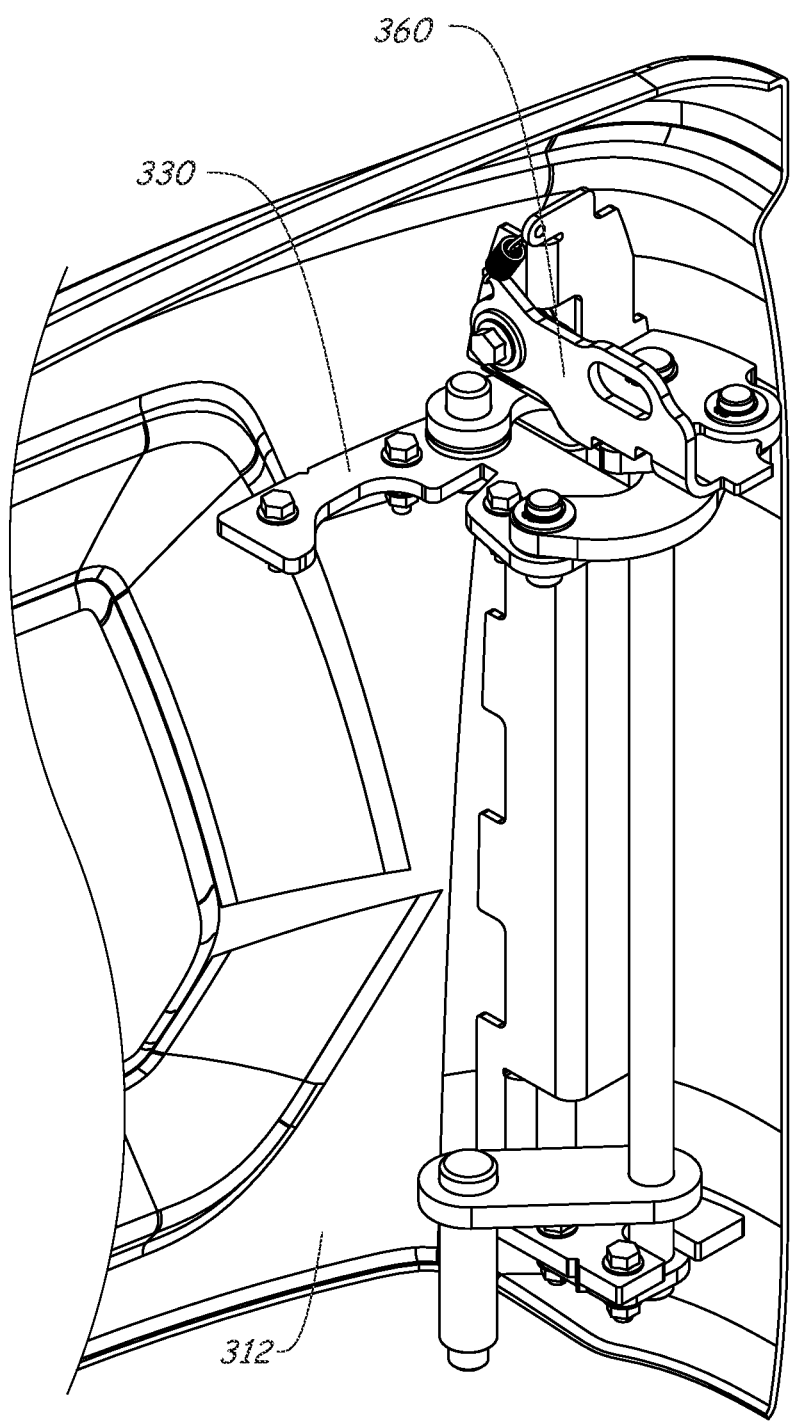
FIG. 8 illustrates the mechanism of FIG. 7 with the catch removed.

A catch 360 is pivotally mounted to the bracket 332 at pivot 362. The catch 360 moves between an engaged and a disengaged position. In the engaged position (shown in FIG. 5), the catch engages linkage to prevent the tailgate from closing. In one embodiment, the catch can only be moved to the engaged position when the tailgate is in the fully opened position. A biasing mechanism 364 biases the catch 360 to the engaged position. Once in the engaged position, the catch must be lifted out of the engaged position. An aperture 366 is provided to allow an operator to lift the catch out of the engaged position. FIG. 8 shows the catch in a disengaged position.

Although the present invention has been described with reference to preferred embodiments, workers skilled in the art will recognize that changes may be made in form and detail without departing from the scope of the discussion.

What is claimed is:

1. A linkage for rotatably securing a tailgate to a frame of a power machine, comprising:
   first and second tailgate brackets, each configured to be rigidly attached to the tailgate;
   a frame bracket configured to be rigidly mounted to the frame;
   a first attachment structure for operably coupling the tailgate and the frame, the first attachment structure including first and second links each pivotally coupled to the first tailgate bracket and the frame bracket;
   a second attachment structure configured to be pivotally coupled to each of the tailgate and the frame, the second attachment structure including the second tailgate bracket and being spaced apart from the first attachment structure; and
   a connecting member pivotally coupled to the first and second tailgate brackets to define a pivot axis about which the tailgate can rotate.

2. The linkage of claim 1, wherein the connecting member is operably coupled to one of the first link and the second link.

3. A power machine having a frame, an engine mounted to the frame, an aperture in the frame for allowing access to the engine, a cover for the aperture, the cover being moveable between a closed position and an opened position, and a mounting structure for pivotally mounting the cover to the frame, the mounting structure comprising:
   a first attachment structure having a first cover bracket mounted to the cover and a machine bracket mounted to the frame for pivotally mounting the cover to the frame, the first attachment structure further including a first link pivotally coupled to the frame at a first connection point and pivotally coupled to the cover at a second connection point, and a second link pivotally coupled to the frame at a third connection point and pivotally coupled to the cover at a fourth connection point;

a second attachment structure having a second cover bracket mounted to the cover for pivotally mounting the cover to the frame, the second attachment structure being spaced apart from the first attachment structure; and a connection member coupled to each of the first and second cover brackets;

wherein the cover pivots about the connection member as it moves between the closed position and the open position.

4. The power machine of claim 3, wherein the second attachment structure includes a third link pivotally coupled to the frame at a fifth connection point and pivotally coupled to the cover at a sixth connection point.

5. The power machine of claim 4, wherein the connection member is coupled to the second link at the fourth connection point and to the third link at the sixth connection point.

6. The power machine of claim 5, wherein the second link pivots about the fifth connection point as the cover is moved between the closed position and the open position so that the sixth connection point moves along an arcuate path between a first end point and a second end point.

7. The power machine of claim 6, wherein when the cover is in the closed position, the fourth connection point is at a first end point of the arcuate path and wherein as the cover moves from the closed position to an intermediate position between the closed position and the open position, the second link moves toward the second end of the arcuate path and as the cover moves from the intermediate position to the open position, the second link moves toward the first end of the arcuate path.

8. The power machine of claim 7, wherein when the cover moves from the open position to the intermediate position, the second link moves toward the second end of the arcuate path and as the cover moves from the intermediate position to the closed position, the second link moves toward the first end of the arcuate path.

9. The power machine of claim 3 and further comprising:
a catch attached to one of the cover and the frame and moveable between a disengaged position and an engaged position, wherein in the disengaged position, the cover is capable of moving between open and closed position and in the engaged position, the cover is prevented from moving from the open position.

10. The power machine of claim 9, wherein the catch is biased to the engaged position.

11. The power machine of claim 3, wherein the connection member is generally vertically aligned.

12. A method of coupling a tailgate to a frame of a power machine so that the tailgate is moveable between a closed position and an opened position, comprising:
providing a first attachment structure having a four bar linkage including:
providing a first link that is coupled to a machine bracket attached to the frame at a first pivotal joint and to a first tailgate bracket that is attached to the tailgate at a second pivotal joint; and
providing a second link that is coupled to a machine bracket attached to the frame at a third pivotal joint and to the first tailgate bracket that is attached to the tailgate at a fourth pivotal joint;
wherein the four bar linkage is defined by the first link, the second link, a portion of the frame between the first pivotal joint and the third pivotal joint, and a portion of the tailgate between the second pivotal joint and the fourth pivotal joint;
providing a second attachment structure that is operably coupled to the tailgate and the frame; and
attaching a connecting rod having an axis running therethrough to the first tailgate bracket and the second attachment structure so that when the tailgate moves along a path between the opened and closed positions, the tailgate pivots about the axis for at least a portion of the path.

13. The method of claim 12 wherein attaching the connecting rod includes attaching the connecting rod to the second link at the fourth pivotal joint.

14. The method of claim 12 and further comprising:
providing a catch operable to prevent the tailgate from moving from the opened position to the closed position.

* * * * *